US008527392B2

(12) United States Patent
Levy et al.

(10) Patent No.: US 8,527,392 B2
(45) Date of Patent: Sep. 3, 2013

(54) METHOD AND APPARATUS FOR HOLDING A TWO-STAGE LIVE AUCTION FOR ON-SITE AND ON-LINE BIDDERS

(75) Inventors: Daniele Levy, San Francisco, CA (US); Brad Handler, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 141 days.

(21) Appl. No.: 12/839,259

(22) Filed: Jul. 19, 2010

(65) Prior Publication Data

US 2010/0287066 A1 Nov. 11, 2010

Related U.S. Application Data

(63) Continuation of application No. 11/264,526, filed on Nov. 1, 2005, now Pat. No. 7,797,222, which is a continuation of application No. 09/620,209, filed on Jul. 19, 2000, now abandoned, which is a continuation-in-part of application No. 09/457,466, filed on Dec. 8, 1999, now Pat. No. 7,162,446.

(60) Provisional application No. 60/111,717, filed on Dec. 8, 1998.

(51) Int. Cl.
*G06F 17/00* (2006.01)

(52) U.S. Cl.
USPC .............................................. 705/37; 705/80

(58) Field of Classification Search
USPC .................................................... 705/37, 80
See application file for complete search history.

(56) References Cited

U.S. PATENT DOCUMENTS 3,573,747 A 4/1971 Adams et al.
3,581,072 A 5/1971 Nymeyer
3,687,256 A 8/1972 Jones
4,412,287 A 10/1983 Braddock, III
4,674,044 A 6/1987 Kalmus et al.

(Continued)

FOREIGN PATENT DOCUMENTS

CA 2253543 A1 3/1997
FR 2658635 A1 8/1991

(Continued)

OTHER PUBLICATIONS

U.S. Appl. No. 09/457,466, Advisory Action mailed Jul. 1, 2004, 2 pgs.

(Continued)

*Primary Examiner* — Daniel Felten
(74) *Attorney, Agent, or Firm* — Schwegman Lundberg & Woessner, P.A.

(57) ABSTRACT

A method and apparatus are provided for conducting a two-stage live auction for on-site and on-line bidders, the two stages including a live, in-person auction component and a real-time online bidding environment component. Bidding information associated with an item in the online bidding environment is updated to reflect a current bid associated with the item in the live, in-person auction. During the live, in-person auction, a bid is be accepted from an online bidder in the online environment that reflects the online bidder's bid price for the item. Subsequently, the system bids on behalf of the online bidder against other online bidders as well as one or more live bidders that are participating in the live, in-person. As such, the live auction enables real-time online bidding in a live, in-person auction.

9 Claims, 13 Drawing Sheets

(56) References Cited

U.S. PATENT DOCUMENTS 4,677,552 A 6/1987 Sibley, Jr.
4,789,928 A 12/1988 Fujisaki
4,799,156 A 1/1989 Shavit et al.
4,823,265 A 4/1989 Nelson
4,864,516 A 9/1989 Gaither et al.
4,903,201 A 2/1990 Wagner
4,992,940 A 2/1991 Dworkin
5,063,507 A 11/1991 Lindsey et al.
5,077,665 A 12/1991 Silverman et al.
5,101,353 A 3/1992 Lupien et al.
5,136,501 A 8/1992 Silverman et al.
5,168,446 A 12/1992 Wiseman
5,205,200 A 4/1993 Wright
5,243,515 A 9/1993 Lee
5,258,908 A 11/1993 Hartheimer et al.
5,280,305 A 1/1994 Monroe et al.
5,280,422 A 1/1994 Moe et al.
5,283,731 A 2/1994 Lalonde et al.
5,285,383 A 2/1994 Lindsey et al.
5,297,031 A 3/1994 Gutterman et al.
5,297,032 A 3/1994 Trojan et al.
5,305,200 A 4/1994 Hartheimer et al.
5,325,297 A 6/1994 Bird et al.
5,329,589 A 7/1994 Fraser et al.
5,335,170 A 8/1994 Petteruti et al.
5,345,091 A 9/1994 Craig et al.
5,375,055 A 12/1994 Togher et al.
5,383,113 A 1/1995 Kight et al.
5,394,324 A 2/1995 Clearwater
5,402,336 A 3/1995 Spiegelhoff et al.
5,424,944 A 6/1995 Kelly
5,426,281 A 6/1995 Abecassis
5,453,926 A 9/1995 Stroschin et al.
5,485,510 A 1/1996 Colbert
5,521,815 A 5/1996 Rose, Jr.
5,526,479 A 6/1996 Barstow et al.
5,539,450 A 7/1996 Handelman
5,553,145 A 9/1996 Micali
5,557,728 A 9/1996 Garrett et al.
5,592,375 A 1/1997 Salmon et al.
5,596,994 A 1/1997 Bro
5,598,557 A 1/1997 Doner et al.
5,640,569 A 6/1997 Miller et al.
5,657,389 A 8/1997 Houvener
5,664,111 A 9/1997 Nahan et al.
5,664,115 A 9/1997 Fraser
5,675,784 A 10/1997 Maxwell et al.
5,689,652 A 11/1997 Lupien et al.
5,694,546 A 12/1997 Reisman
5,706,457 A 1/1998 Dwyer et al.
5,708,780 A 1/1998 Levergood et al.
5,710,889 A 1/1998 Clark et al.
5,715,314 A 2/1998 Payne et al.
5,715,402 A 2/1998 Popolo
5,717,989 A 2/1998 Tozzoli et al.
5,722,418 A 3/1998 Bro
5,727,165 A 3/1998 Ordish et al.
5,737,599 A 4/1998 Rowe et al.
5,760,917 A 6/1998 Sheridan
5,761,655 A 6/1998 Hoffman
5,771,291 A 6/1998 Newton et al.
5,771,380 A 6/1998 Tanaka et al.
5,790,790 A 8/1998 Smith et al.
5,794,207 A 8/1998 Walker et al.
5,794,216 A 8/1998 Brown
5,794,219 A 8/1998 Brown
5,799,285 A 8/1998 Klingman
5,803,500 A 9/1998 Mossberg
5,818,914 A 10/1998 Fujisaki
5,826,241 A 10/1998 Stein et al.
5,826,244 A 10/1998 Huberman
5,835,896 A 11/1998 Fisher et al.
5,845,265 A 12/1998 Woolston
5,845,266 A 12/1998 Lupien et al.
5,850,442 A 12/1998 Muftic
5,872,848 A 2/1999 Romney et al.
5,873,069 A 2/1999 Reuhl et al.
5,884,056 A 3/1999 Steele
5,890,138 A 3/1999 Godin et al.
5,905,974 A 5/1999 Fraser et al.
5,905,975 A 5/1999 Ausubel
5,913,040 A 6/1999 Rakavy et al.
5,922,074 A 7/1999 Richard et al.
5,924,072 A 7/1999 Havens
5,926,794 A 7/1999 Fethe
5,974,398 A 10/1999 Hanson et al.
5,974,412 A 10/1999 Hazlehurst et al.
5,991,739 A 11/1999 Cupps et al.
6,012,045 A 1/2000 Barzilai et al.
6,023,685 A 2/2000 Brett et al.
6,035,288 A 3/2000 Solomon
6,035,402 A 3/2000 Vaeth et al.
6,044,363 A 3/2000 Mori et al.
6,047,264 A 4/2000 Fisher et al.
6,049,785 A 4/2000 Gifford
6,055,518 A 4/2000 Franklin et al.
6,058,417 A 5/2000 Hess et al.
6,061,448 A 5/2000 Smith et al.
6,073,117 A 6/2000 Oyanagi et al.
6,078,906 A 6/2000 Huberman
6,085,176 A 7/2000 Woolston
6,104,815 A 8/2000 Alcorn et al.
6,119,137 A 9/2000 Smith et al.
6,141,653 A 10/2000 Conklin et al.
6,178,408 B1 1/2001 Copple et al.
6,192,407 B1 2/2001 Smith et al.
6,202,051 B1 3/2001 Woolston
6,243,691 B1 6/2001 Fisher et al.
6,415,269 B1 7/2002 Dinwoodie
6,449,601 B1 * 9/2002 Friedland et al. ............... 705/37
6,523,037 B1 2/2003 Monahan et al.
7,162,446 B1 1/2007 Handler
7,797,222 B2 9/2010 Levy et al.
7,840,472 B1 11/2010 Levy et al.
2003/0131006 A1 7/2003 Monahan et al.
2006/0112003 A1 5/2006 Levy et al.

FOREIGN PATENT DOCUMENTS

JP 04-342065 A 11/1992
JP 10-229555 A 8/1998
JP 2005-050288 A 2/2005
KR 20000037331 A 7/2000
NL 9300266 A 2/1993
WO WO-9215174 A1 9/1992
WO WO-9422108 A1 9/1994
WO WO-9517711 A1 6/1995
WO WO-9634356 A1 10/1996
WO WO-9737315 A1 10/1997
WO WO-9834187 A1 8/1998
WO WO-9835468 A2 8/1998
WO WO-9963461 A1 12/1999
WO WO-0022907 A2 4/2000
WO WO-0025218 A1 5/2000
WO WO-0039735 A2 7/2000
WO WO-0141013 A1 6/2001

OTHER PUBLICATIONS

U.S. Appl. No. 09/457,466, Appeal Brief filed Sep. 16, 2004, 11 pgs.

U.S. Appl. No. 09/457,466, Final Office Action mailed Apr. 13, 2004, 11 pgs.

U.S. Appl. No. 09/457,466, Final Office Action mailed Nov. 28, 2001, 6 pgs.

U.S. Appl. No. 09/457,466, Non Final Office Action mailed Mar. 29, 2001, 9 pgs.

U.S. Appl. No. 09/457,466, Non Final Office Action mailed Jun. 4, 2002, 7 pgs.

U.S. Appl. No. 09/457,466, Non Final Office Action mailed Oct. 25, 2002, 11 pgs.

U.S. Appl. No. 09/457,466, Non Final Office Action mailed Oct. 27, 2003, 7 pgs.

U.S. Appl. No. 09/457,466, Non Final Office Action mailed Nov. 20, 2000, 13 pgs.

U.S. Appl. No. 09/457,466, Non Final Office Action mailed Dec. 23, 2004, 7 pgs.
U.S. Appl. No. 09/457,466, Notice of Allowance mailed May 31, 2006, 8 pgs.
U.S. Appl. No. 09/457,466, Notice of Allowance mailed Aug. 10, 2006, 8 pgs.
U.S. Appl. No. 09/457,466, Notice of Allowance mailed Nov. 22, 2005, 8 pgs.
U.S. Appl. No. 09/457,466, Response filed Jan. 4, 2002 to Final Office Action mailed Nov. 28, 2001, 15 pgs.
U.S. Appl. No. 09/457,466, Response filed Jan. 22, 2004 to Non Final Office Action mailed Oct. 27, 2003, 14 pgs.
U.S. Appl. No. 09/457,466, Response filed Jan. 23, 2003 to Non Final Office Action mailed Oct. 25, 2002, 8 pgs.
U.S. Appl. No. 09/457,466, Response filed May 20, 2005 to Non Final Office Action mailed Dec. 23, 2004, 15 pgs.
U.S. Appl. No. 09/457,466, Response filed Jun. 10, 2004 to Final Office Action mailed Apr. 13, 2004, 13 pgs.
U.S. Appl. No. 09/457,466, Response filed Jul. 27, 2001 to Non Final Office Action mailed Mar. 29, 2001, 7 pgs.
U.S. Appl. No. 09/457,466, Response filed Aug. 19, 2002 to Non Final Office Action mailed Jun. 4, 2002, 11 pgs.
U.S. Appl. No. 09/457,466, Response filed Dec. 21, 2000 to Non Final Office Action mailed Nov. 20, 2000, 8 pgs.
U.S. Appl. No. 09/620,809, Advisory Action mailed Apr. 30, 2004, 2 pgs.
U.S. Appl. No. 09/620,809, Examiner Interview Summary mailed Aug. 29, 2008, 2 pgs.
U.S. Appl. No. 09/620,809, Final Office Action mailed Jan. 13, 2004, 14 pgs.
U.S. Appl. No. 09/620,809, Final Office Action mailed Jun. 30, 2008, 12 pgs.
U.S. Appl. No. 09/620,809, Non Final Office Action mailed Jun. 18, 2003, 16 pgs.
U.S. Appl. No. 09/620,809, Non Final Office Action mailed Jun. 22, 2007, 11 pgs.
U.S. Appl. No. 09/620,809, Non Final Office Action mailed Nov. 3, 2004, 4 pgs.
U.S. Appl. No. 09/620,809, Non Final Office Action mailed Nov. 3, 2005, 4 pgs.
U.S. Appl. No. 09/620,809, Non-Final Office Action mailed Nov. 28, 2008, 6 pgs.
U.S. Appl. No. 09/620,809, Notice of Allowance mailed Jan. 4, 2010, 8 pgs.
U.S. Appl. No. 09/620,809, Notice of Allowance mailed Jun. 16, 2010, 6 pgs.
U.S. Appl. No. 09/620,809, Notice of Allowance mailed Jun. 26, 2009, 6 pgs.
U.S. Appl. No. 09/620,809, Preliminary Amendment filed Jul. 22, 2004, 15 pgs.
U.S. Appl. No. 09/620,809, Response filed Jan. 3, 2005 to Restriction Requirement mailed Nov. 3, 2004, 11 pgs.
U.S. Appl. No. 09/620,809, Response filed Mar. 2, 2009 to Non-Final Office Action mailed Nov. 28, 2008, 10 pgs.
U.S. Appl. No. 09/620,809, Response filed Mar. 15, 2004 to Final Office Action mailed Jan. 13, 2004, 16 pgs.
U.S. Appl. No. 09/620,809, Response filed Apr. 2, 2007 to Restriction Requirement mailed Feb. 1, 2007, 9 pgs.
U.S. Appl. No. 09/620,809, Response filed Sep. 10, 2008 to Final Office Action mailed Jun. 30, 2008, 11 pgs.
U.S. Appl. No. 09/620,809, Response filed Sep. 18, 2003 to Non Final Office Action mailed Jun. 18, 2003, 17 pgs.
U.S. Appl. No. 09/620,809, Response filed Nov. 21, 2007 to Non-Final Office Action mailed Jun. 21, 2007, 12 pgs.
U.S. Appl. No. 09/620,809, Restriction Requirement mailed Feb. 1, 2007, 5 pgs.
U.S. Appl. No. 09/620,809, Restriction Requirement mailed Nov. 3, 2004, 4 pgs.
U.S. Appl. No. 11/264,526, Final Office Action mailed Apr. 24, 2009, 11 pgs.
U.S. Appl. No. 11/264,526, Non-Final Office Action mailed Sep. 8, 2009, 5 pgs.
U.S. Appl. No. 11/264,526, Non-Final Office Action mailed Oct. 9, 2008, 11 pgs.
U.S. Appl. No. 11/264,526, Notice of Allowance mailed Mar. 23, 2010, 6 pgs.
U.S. Appl. No. 11/264,526, Preliminary Amendment filed Nov. 1, 2005, 11 pgs.
U.S. Appl. No. 11/264,526, Response filed Jan. 9, 2009 to Non-Final Office Action mailed Oct. 9, 2008, 11 pgs.
U.S. Appl. No. 11/264,526, Response filed Jul. 24, 2009 to Final Office Action mailed Apr. 24, 2009, 13 pgs.
U.S. Appl. No. 11/264,526, Response filed Dec. 8, 2009 to Non Final Office Action mailed Sep. 8, 2009, 14 pgs.
"Auction Universe Website", [Online]. Retrieved from the Internet: <URL: http://www.auctionuniverse.com>, (Oct. 23, 1998), 6 pgs.
Australian Application Serial No. 20491/00, Examiner's Report mailed Nov. 17, 2003, 1 pg.
Australian Application Serial No. 20491/00, Examiner's Report mailed Nov. 23, 2004, 8 pgs.
Australian Application Serial No. 20491/00, Response filed Nov. 15, 2004 to Examiner's Report mailed Nov. 17, 2003, 16 pgs.
Canadian Application SerialNo. 2,353,999, Office Action mailed Apr. 27, 2009, 112 pgs.
Canadian Application Serial No. 2,353,999, Voluntary Amendment mailed Feb. 26, 2004, 20 pgs.
European Application Serial No. 99964201.0, Examiner's Report mailed Jul. 28, 2005, 4 pgs.
European Application Serial No. 99964201.0, Response filed Jan. 17, 2006 to Examiner's Report mailed Jul. 28, 2005, 7 pgs.
International Application Serial No. PCT/US99/29312, International Preliminary Examination Report mailed Jan. 9, 2001, 3 pgs.
International Application Serial No. PCT/US99/29312, International Search Report mailed Apr. 18, 2000, 3 pgs.
Japanese Application Serial Appl. No. 2000-587289, Appeal filed Dec. 8, 2006 to Final Office Action mailed Sep. 19, 2006, 14 pgs.
Japanese Application Serial No. 2000-587289, Final Office Action mailed Sep. 19, 2006, 13 pgs.
Japanese Application Serial No. 2000-587289, Non Final Office Action mailed May 26, 2009, 16 pgs.
Japanese Application Serial No. 2000-587289, Notice of Allowance mailed Jun. 8, 2010, 2 pgs.
Japanese Application Serial No. 2000-587289, Office Action mailed Feb. 22, 2006, 12 pgs.
Japanese Application Serial No. 2000-587289, Response filed Aug. 22, 2006 to Office Action mailed Feb. 28, 2006, 12 pgs.
Japanese Application Serial No. 2000-587289, Response filed Nov. 26, 2009 to Non Final Office Action mailed May 26, 2009, 11 pgs.
"Netgrocer Website", [Online]. Retrieved from the Internet: <URL: http://www.netgrocer.com>, (Oct. 23, 1998), 3 pgs.
"Onsale Auction Website", [Online]. Retrieved from the Internet: <URL: http://www.onsale.com>, (Oct. 23, 1998), 3 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pages.
"Yahoo Auctions Website", [Online]. Retrieved from the Internet: <URL: http://auctions.yahoo.com>, (Oct. 23, 1998), 5 pgs.
Baumann, G. W, "Personal Optimized Decision/Transaction Program", IBM Technical Disclosure Bulletin (Jan. 1995), 83-84.
Beam, Carrie, et al., "Automated Negotiations: A Survey of the State of the Art", Fisher Center for Information Technology & Management—Walter A. Haas School of Business, 14 Pages.
Beam, Carrie, et al., "Electronic Negotiation through Internet-based Auctions", CITM Working Paper 96-WP-1019, Fisher Center for Information Technology & Management—Walter A. Haas School of Business, (Dec. 1996), 39 Pages.
Biais, Bruno, et al., "An empirical analysis of the limit order book and the order flow in the Paris Bourse", Journal of Finance, 50(5), (Dec. 1995), 1655-1689.

Business Wire, "Bid.com Announces www.dutchauction.com", Business Wire, Dialog File 16, Access No. 05914806, (Oct. 28, 1998), 1464.
Business Wire, "Mediappraise Receives National Award for Web-based Technology That Enables Companies to Solve Thorny HR Problem", Business Wire, (Dec. 14, 1998), 1-2.
Clemons, E, "Evaluating the prospects for alternative electronic securities", Proceedings of ICIS 91: 12th International Conference on Information Systems, (Dec. 16-18, 1991), 53-61.
Cooper, J., "Going Going Gone! Tradition Gives Way to Technology", British Telecom World, Dialog File148, Access No. 04587041, (Mar. 1990), 2 pgs.
Dunlap, C., "Going Once, Going Twice . . . Sold!", Computer Reseller News, (Dec. 1997), n766 pp. 1.
Graham, I, "The Emergence of Linked Fish Markets in Europe", Focus Theme, 1-4.
Hauser, R, "Anonymous Delivery of Goods in Electronic Commerce", IBM Technical Disclosure Bulletin, 39(3), (Mar. 1996), 363-366.
Hess, C M, et al., "Computerized Loan Organization System: An Industry Case Study of the Electronic Markets Hypothesis", MIS Quarterly, vol. 18(3), (Sep. 1994), 251-274.
Hong, Zhou, "Multilingual information retrieval system", Proc. SPIE, vol. 2916, Multimedia Storage and Archiving Systems, C.-C. J. Kuo; Ed., (Nov. 1996), 33-44.
Kikuchi, Hiroaki, et al., "Multi-Round Anonymous Auction Protocols", IEICE Trans. Inf. & Syst., vol. E82-D, No. 4, (Apr. 1999), 769-777.
Klein, Stefan, "Introduction to Electronic Auctions", EM—Electronic Auctions. EM—Electronic Markets, vol. 7, No. 4, (Dec. 1997), 3-6.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
Liepins, P J, "A browser based image bank, useful tool or expensive toy?", Med Inform, 23(3), (Jul.-Sep. 1998), 199-206.
Malone, T., et al., "Electronic Markets and Electronic Hierarchies", Communications of the ACM, 14(25), (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.
Mohan, Rakesh, "Text-based search of TV news stories", SPIE, vol. 2916, Multimedia Storage and Archiving Systems, C.-C. J. Kuo; Ed., (Nov. 1996), 2-13.
Neo, B S, "The implementation of an electronic market for pig trading in Singapore", Journal of Strategic Information Systems; vol. 1(5), (Dec. 1992), 278-288.
Ootake, T., "Monthly Turnover of Ten Million Yen Through Auctions: Stake on EC by Introducing a New System", Orient Corporation, Nikkei Multimedia, (Aug. 15, 1998), 92-97.
Post, D L, et al., "Application of auctions as a pricing mechanism for the interchange of electric power", IEEE Transactions on Power Systems, 10(3), (Aug. 1995), 1580-1584.
PR Newswire, "MOAI Technologies Announce Live Exchange 2.1", PR Newswire, (Sep. 14, 1998), 3 pgs.
Preist, Chris, et al., "Adaptive Agents in a Persistent Shout Double Auction", International Conference on Information and Computation Economies, Proceedings of the first international conference on Information and computation economies, (1999), 11-18.
Reck, M., "Formally Specifying an Automated Trade Execution System", The Journal of Systems and Software, 1993, Elsevier Science Publishing, USA, (1993), 245-252.
Reck, Martin, "Trading-Process Characteristics of Electronic Auctions", Focus Theme, vol. 7, No. 4, (1997), 17-23.
Resnick, Paul, "Reputation systems", Communications of the ACM, 43(12), (Dec. 2000), 45-48.
Rockoff, T E, et al., "Design of an Internet-based system for remote Dutch auctions", Internet Research: Electronic Networking Applications and Policy, vol. 5(4), (Jan. 1, 1995), 10-16.
Schmid, B F, "The Development of Electronic Commerce", EM—Electronic Markets, No. 910, (Oct. 1993), 2 pgs.
Siegmann, Ken, "Nowhere to go but up", PC Week; vol. 12(42), Ziff-Davis Publishing Company, (Oct. 23, 1995), 1-3.
Teich, Jeffrey, et al., "Multiple-issue auction and market algorithms for the world wide web", Decision Support Systems, vol. 26, (1999), 49-66.
Telecomworldwire, "Auction House Moves for Internet Business", Internet Business News, Dialog File 636, Access No. 02809791, (Aug. 1995), 1 pg.
Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, 1-10.
Turban, Efraim, "Auctions and Bidding on the Internet: An Assessment", Focus Theme, EM—Electronic Markets, vol. 7, No. 4, (1997), 7-11.
Van Heck, E., et al., "Experiences with Electronic Auctions in the Dutch Flower Industry", Focus Theme, Erasmus University, The Netherlands, 6 pgs.
Warbelow, A, et al., "Aucnet: TV Auction Network System", Harvard Business School Case/Study, HBVR#9-190-001, USA, (Jul. 1989), 1-15.
Zwass, V., "Electronic Commerce: Structures and Issues", International Journal of Electronic Commerce, Fall 1996, vol. 1, No. 1, (Fall 1996), 3-23.

* cited by examiner

METHOD AND APPARATUS FOR HOLDING A TWO-STAGE LIVE AUCTION FOR ON-SITE AND ON-LINE BIDDERS

RELATED APPLICATIONS

This application is a continuation of U.S. application Ser. No. 11/264,526, filed Nov. 1, 2005, which is a continuation of U.S. application Ser. No. 09/620,209, filed Jul. 21, 2000, which is a Continuation-in-Part of U.S. application Ser. No. 09/457,466, filed Dec. 8, 1999, which claims the benefit under 35 U.S.C. 119(e) to U.S. Provisional Application No. 60,111,717, filed Dec. 8, 1998, all of which are incorporated herein by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the fields of auctioning and online commerce. More particularly, the invention relates to an online live auction format that combines features of both Internet and traditional, real world auctions.

BACKGROUND OF THE INVENTION

With the advent of online auctioning pioneered by eBay Inc., the assignee of the present invention, more and more Internet users are realizing the ease and convenience of buying items online. As the leading person-to-person trading site, buyers are compelled to trade on eBay's web site due to the large amount of content available. Similarly, sellers are attracted to eBay to conduct business where there are the most buyers. Ebay currently provides over two million new auctions, and 250,000 new items every day from which users may choose.

Auction houses that run live, real-time, on-site auctions ("traditional auctions") continue to experience much success. However, geographic barriers, travel costs, and other constraints limit the participation in such auctions.

It is desirable, therefore, to expand the reach of traditional auctions via the Internet. In particular, it would be advantageous to combine the best of both Internet and traditional auctions into a live auction that enables real-time online bids in a live, in person auction.

BRIEF DESCRIPTION OF THE DRAWINGS

The present invention is illustrated by way of example, and not by way of limitation, in the figures of the accompanying drawings and in which.

DETAILED DESCRIPTION

Figure 1:
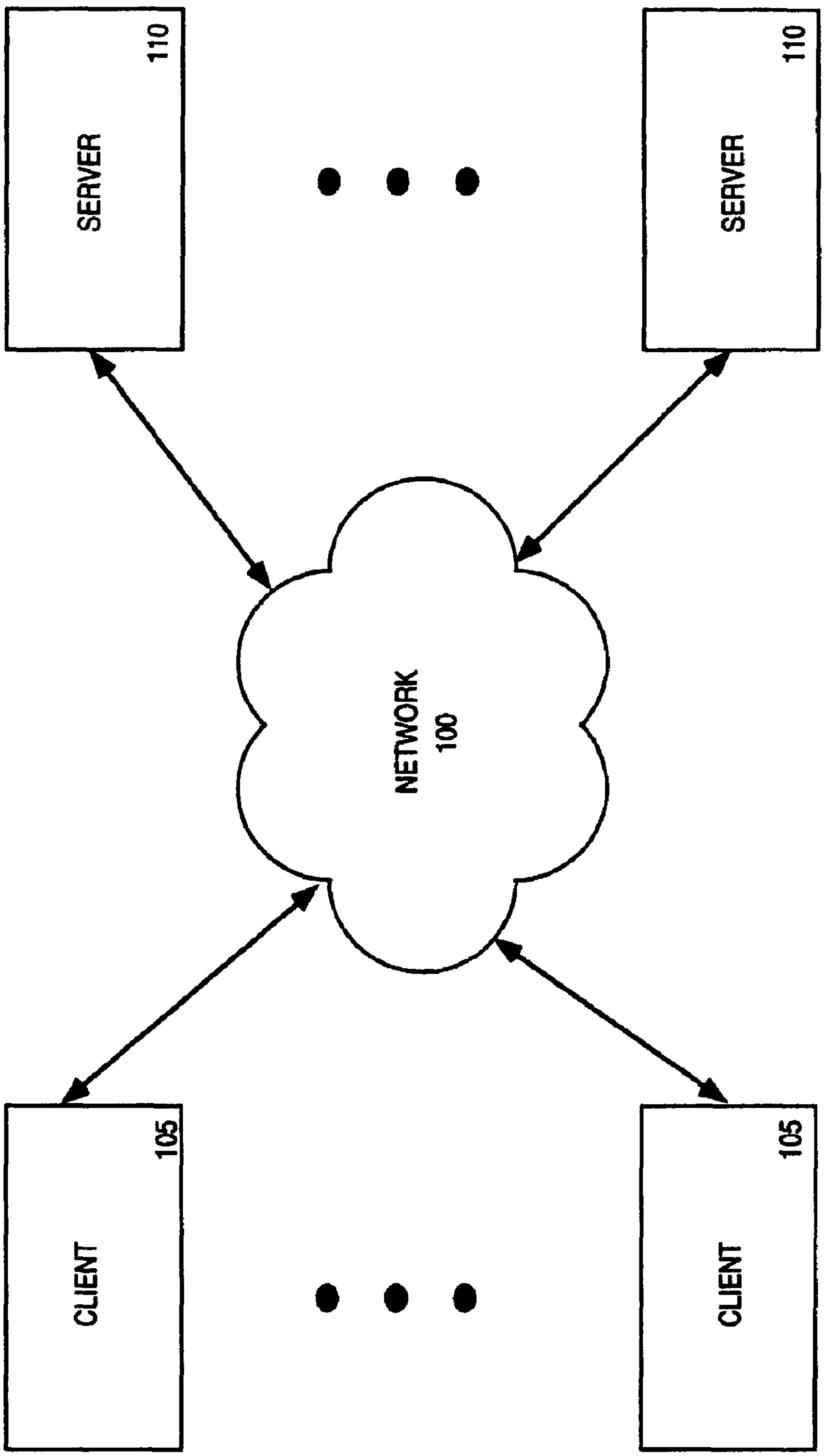
FIG. 1 is a simplified view of an exemplary client-server environment in which the live auction may occur according to one embodiment of the present invention.

A method and apparatus are described for carrying out a live auction that combines various features of traditional and online auctions, thereby enabling real-time online bids in a live, in-person auction. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

As will be described in greater detail below, the present invention includes features that seek to enhance the traditional auctioning experience. According to one embodiment, a live auction combines various features of traditional and Internet auctions (also referred to as online auctions). In a first stage of the live auction, prior to a live, in-person auction, online users are provided access to catalog information for searching and viewing of items available in the live, in-person auction. In addition, during this first stage, any absentee bids are accepted from the online users for items available in the live, in-person auction. Subsequently, in a second stage of the live auction, the live, in-person auction begins. During this stage, bidding information is updated on the online auction site as bids from online bidders as well as live bidders are submitted to the live, in-person auction. During a final end of auction stage, the item is awarded to the highest bidder. An auction house, such as for example Butterfields, conducts the live, in-person auction. Advantageously, in this manner, the reach of traditional auctions may be expanded via the Internet, thereby enabling real-time online bidding in a live, in-person auction.

In the preferred embodiment, the steps of the present invention are embodied in machine-executable instructions. The instructions can be used to cause a general purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Client-Server Environment

FIG. 1 is a simplified view of an exemplary client-server environment, such as the World Wide Web (the Web), in which the online portion of a live auction may take place. The architecture of the Web follows a conventional client-server model. The terms "client" and "server" are used to refer to a computer's general role as a requester of data (the client) or provider of data (the server). Web clients 105 and Web servers 110 communicate using a protocol such as HyperText Transfer Protocol (HTTP). In the Web environment, Web browsers reside on clients and render Web documents (pages) served by the Web servers. The client-server model is used to communicate information between clients 105 and servers 110. Web servers 110 are coupled to the Internet 100 and respond to document requests and/or other queries from Web clients 105. When a user selects a document by submitting its Uniform Resource Locator (URL), a Web browser, such as Netscape Navigator or Internet Explorer, opens a connection to a server 110 and initiates a request (e.g., an HTTP get) for the document. The server 110 delivers the requested document, typically in the form of a text document coded in a standard markup language such as HyperText Markup Language (HTML).

Exemplary Online Auctioning Site Interface

Figure 2A:
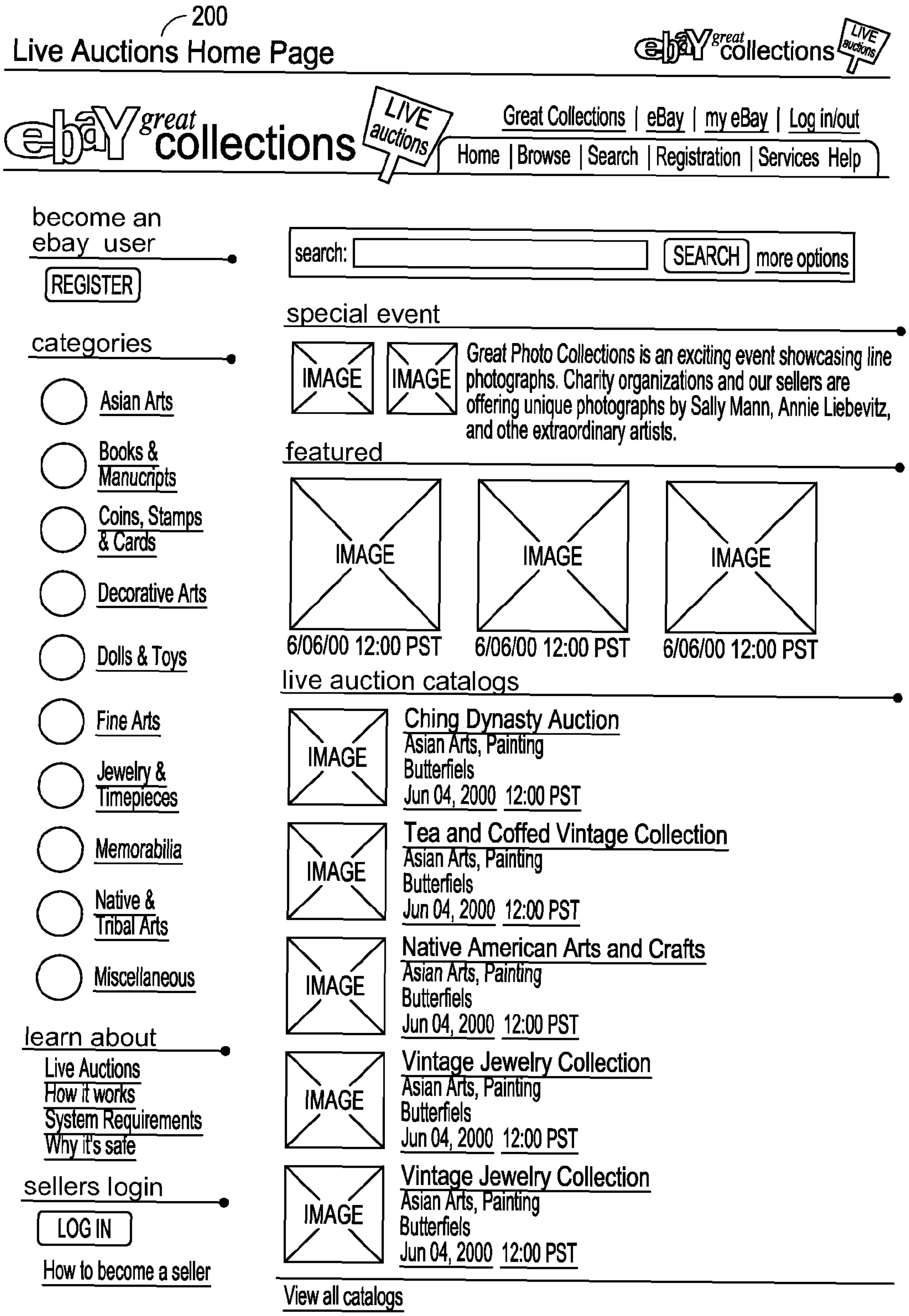
FIGS. 2A-2C depict exemplary online live auction site screens that allows online bidders to participate in a live auction according to one embodiment of the present invention.

FIG. 2A is an exemplary online live auction site screen that allows online bidders to participate in a live, in-person auction. According to one embodiment, when an online bidder wishes to participate in, or inquiry into Live Auctions, the online user is presented with the Live Auctions Home Page screen (Live Auction Screen) 200. The Live Auction Screen 200 provides a listing of all catalogs available in various live, in person auctions in which the online user may bid. From the Live Auction screen 200, the online user is forwarded to various screens that will allow the user to search and view items, listen or view live, in-person auctions and submit real-time bids in the live, in-person auctions.

Figure 2B:
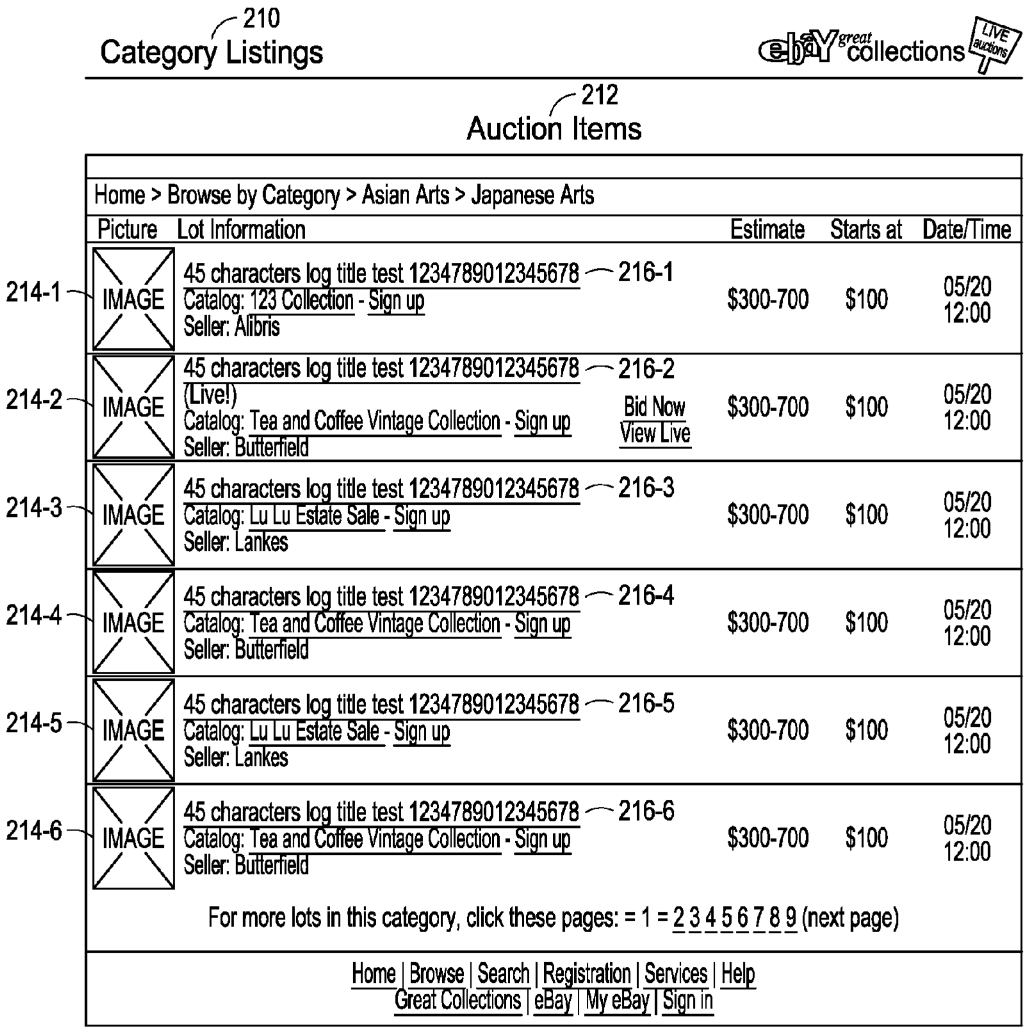

FIG. 2B is an exemplary online live auction site screen that allows online bidders to participate in a live, in-person auction. According to one embodiment, when an online bidder makes a request to search and view a catalog for items available in the live, in-person auction, category listings screen 210 is presented with a textual list of items 212. In this example, each item 214 (214-1, 214-2, . . . , 214-6) includes a hypertext link 216 (216-1, 216-2, . . . , 216-6) having a picture of the item, a title, a brief description, a high/low estimate and a starting price. Responsive to the selection of the hypertext link 215, a subsequent screen (not shown) displays the item and allows the online user to enter an absentee bid for the item 210, when the user will be unavailable during the live, in-person auction. As will be described further below, by providing an absentee bid amount, an absentee bidding system may bid on behalf of the absentee bidder as necessary by increasing the online bidder's bid by the current bid increment until the absentee bid is reached. Advantageously, in this manner, the absentee bidder need not keep track of the auction as it proceeds and is assured he/she will not be outbid at the last minute—unless the absentee bid is exceeded. However, once the absentee bid is exceeded, the absentee bidder has no chance to win the item.

Figure 2C:
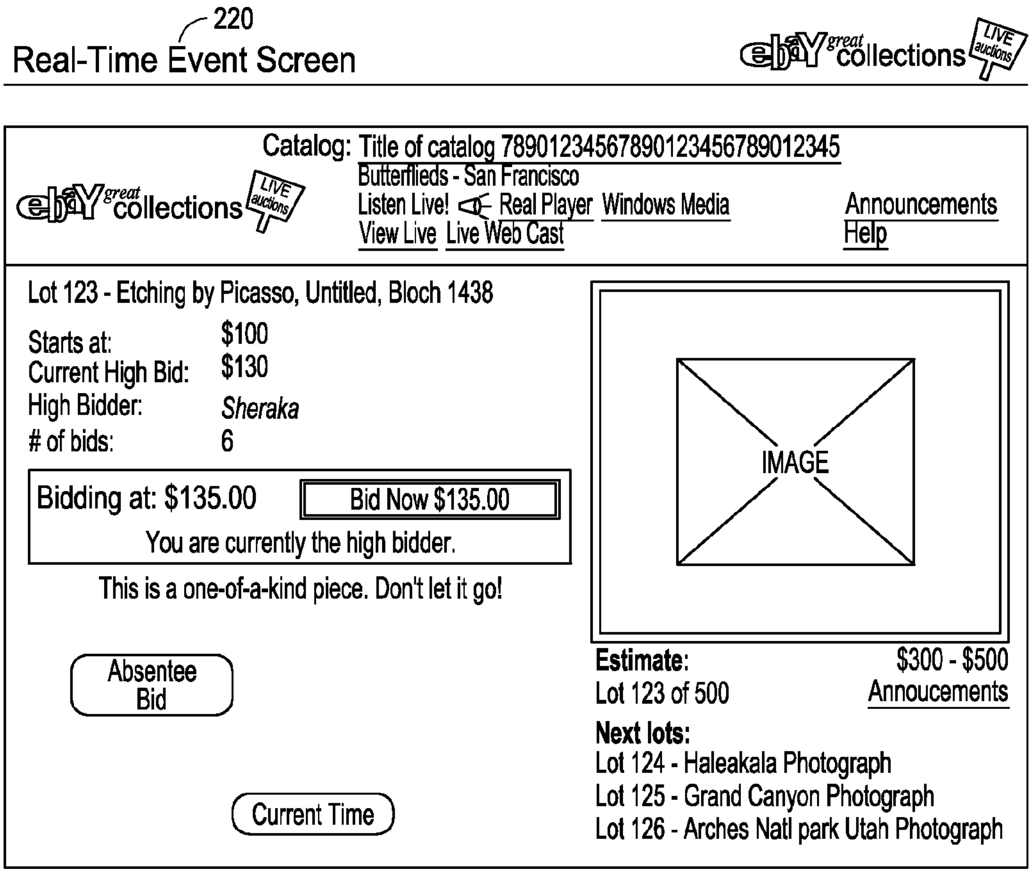

FIG. 2C is an exemplary online live auction site screen that allows online bidders to submit bids in a live, in-person auction. According to one embodiment, when an online bidder makes a request to participate in the live, in-person auction, the user is directed to a real-time event screen 220. The real time event screen 220 is automatically updated to reflect the current lot on sale and also includes the name of the seller and the catalog. As described herein, a lot refers to one item or a group of items that will be auctioned together as part of a sale. Screen 220 also includes the following: a lot number, a lot picture, current price, current high bidder, bid button for automatic bids, bid box for bids above the current price, amount of absentee bid previously placed by any user, on/off button for live webcasts, a promotional message, link to the corrigenda (announcements), titles of next three supporting lots, and the current time.

The real-time event screen 220 enables online bidders to either view or listen to the live, in-person auction. Depending on the option the online bidder selects an audio or audio/video stream is sent to the online bidder's computer. The stream is originated at the auction house and generally captures the auctioneer's actions. The audio stream is provided in, for example, Windows or Real Player formats. Implementation details regarding video and audio streaming over the Internet are known to those skilled in the art and are therefore not provided herein.

Figure 2D:
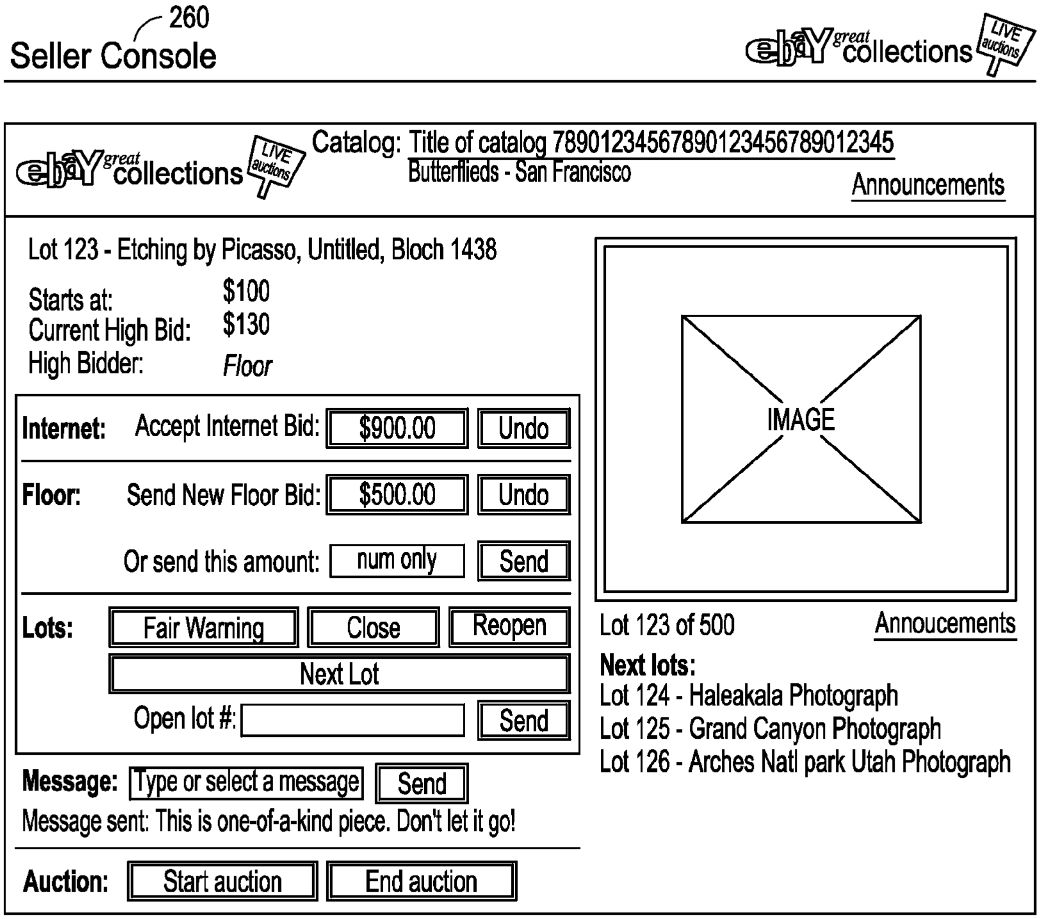
FIG. 2D depicts a seller console according to an exemplary embodiment of the invention.

FIG. 2D depicts an exemplary floor/internet live auction interface (seller console) 260. The live auction seller console 260 allows sellers to accept and communicate Internet bids, update current bid, and call prices and allows opening and closing of lots. The seller console 260 allows bidders, whether on the floor or on the Internet, to participate in the live in-person auction simultaneously and on equal footing.

Figure 2E:
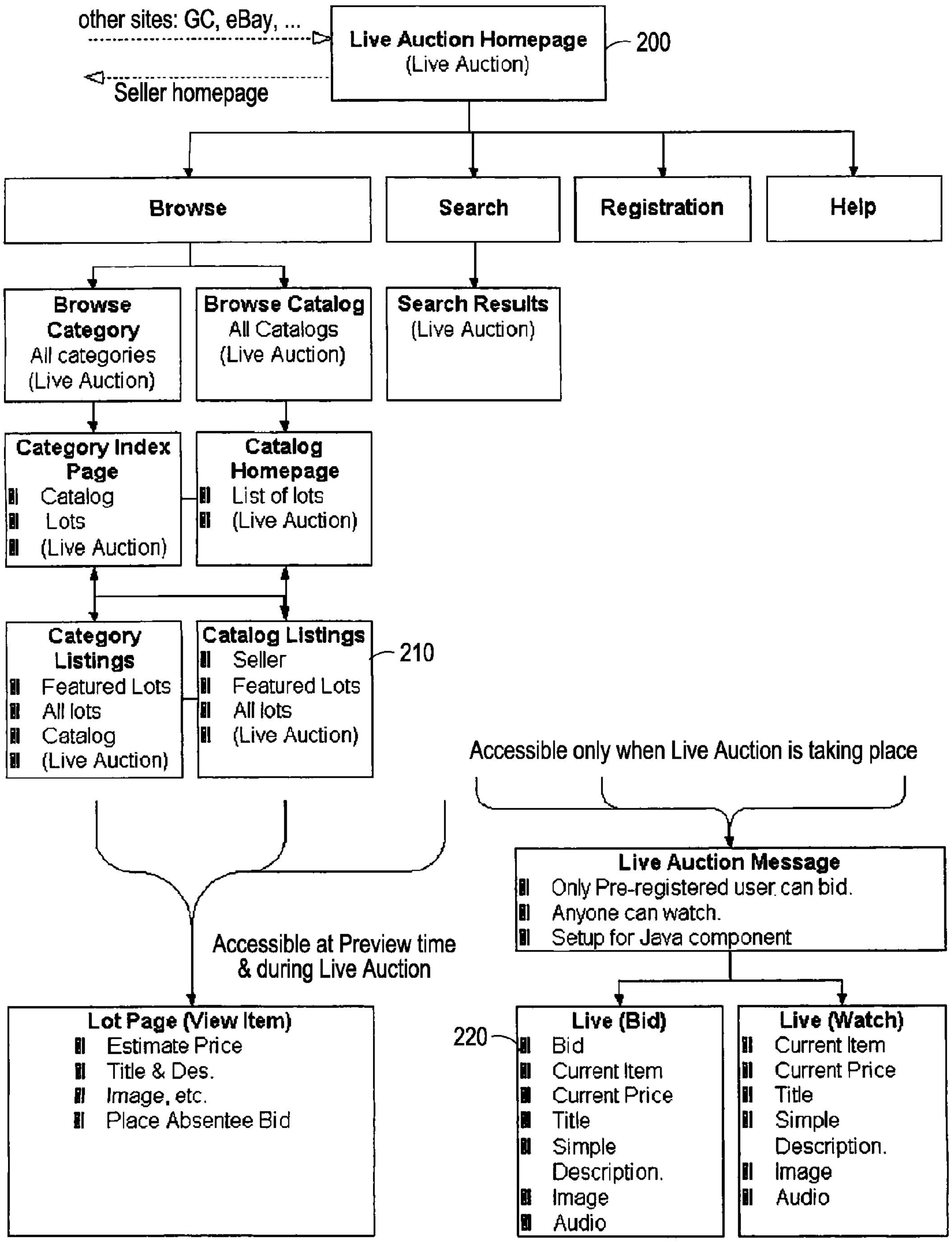
FIG. 2E depicts a Live Auction Site Information Architecture according to an exemplary embodiment of the invention.

FIG. 2E depicts the Live Auction Site Information Architecture 280. The information architecture is provided as an exemplary high level map for navigation of the Live Auction screen 200, as described above. From the Live Auction screen 200, the users may browse or search items, registers for Live Auction, or seek help. Browsing and search of items eventually leads the user to the category listing screen 210, as described above. Once a live, in-person auction begins, the user may submit real-time online bids via the real-time event screen, as described above.

Exemplary Computer System

Figure 3:
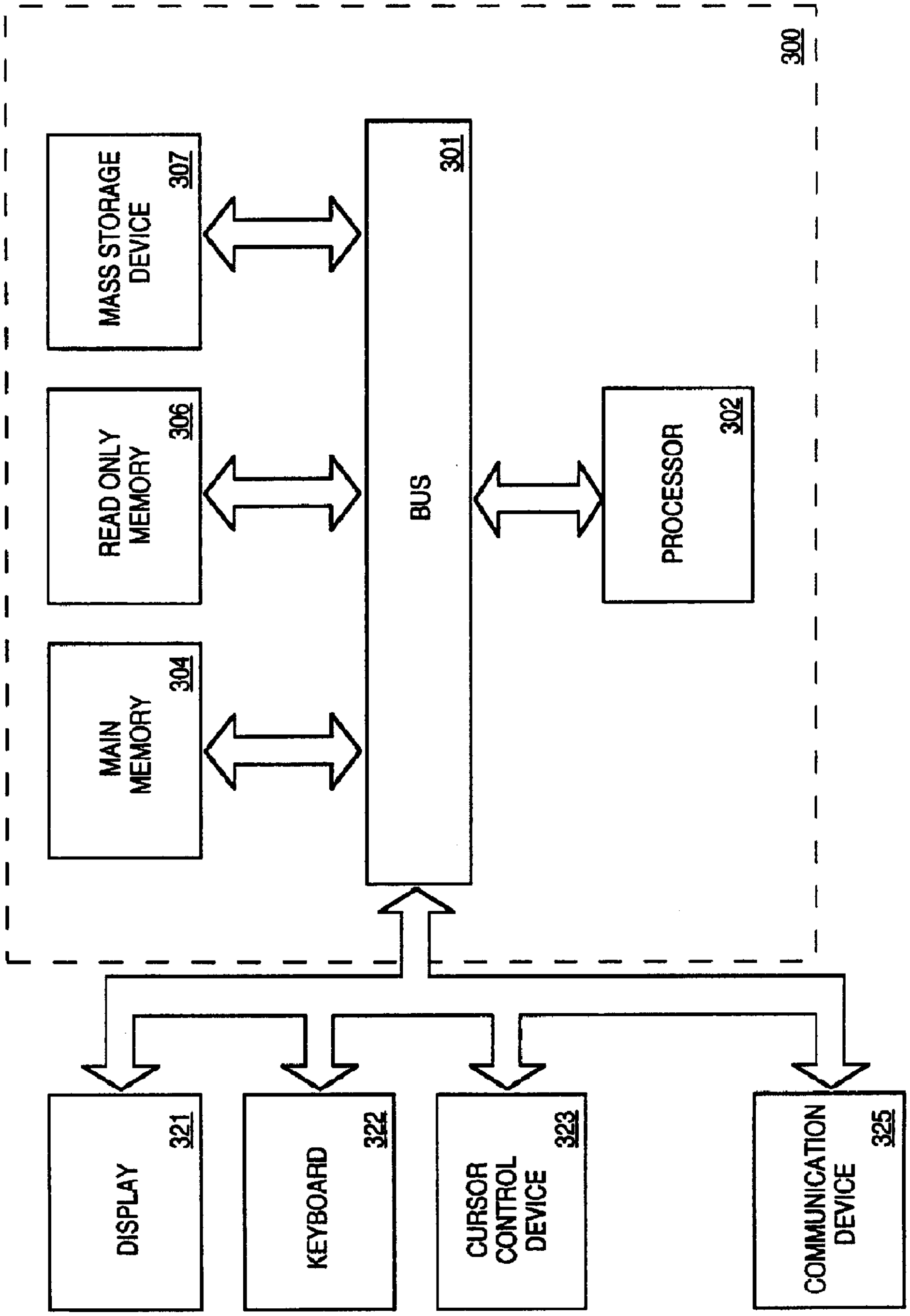
FIG. 3 is an example of a computer system upon which one embodiment of the present invention may be implemented.

A computer system 300 representing an exemplary server in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. Typically, an alphanumeric input device 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers via the Internet, for example. The communication device 325 may include a modem, a network interface card, or other commercially available network interface devices, such as those used for coupling to an Ethernet, token ring, or other type of network. In any event, in this manner, the computer system 300 may be coupled to a number of clients and/or other servers via a conventional network infrastructure, such as a company's Intranet and/or the Internet, for example.

System Overview

Figure 4:
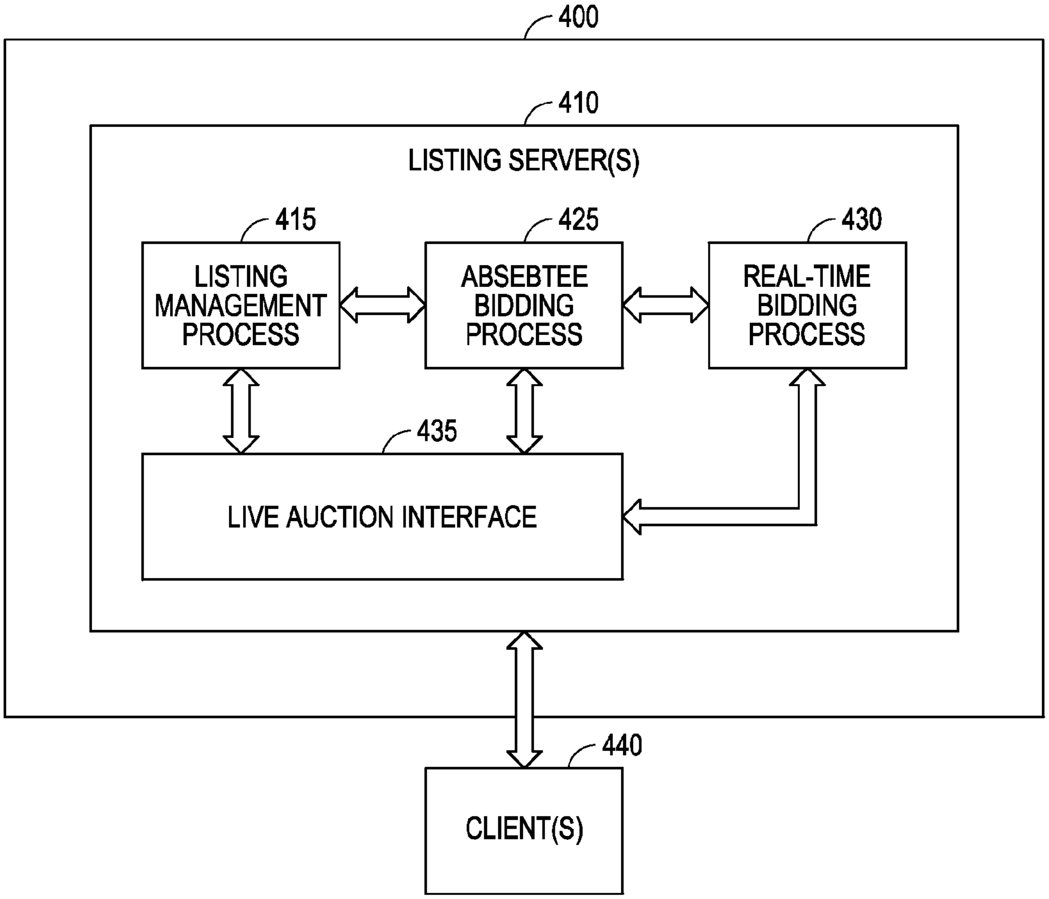
FIG. 4 is a high level illustration of the interaction between various devices and processes according to one embodiment of the present invention.

FIG. 4 is a high level illustration of the interaction between various devices and processes according to one embodiment of the present invention. According to the embodiment depicted, an online, live auction site system 400 may comprise one or more listing servers 410. In this example, the listing servers 410 include a listing management process 415, an absentee bidding process 425, a real-time bidding process 430 and a live auction interface 435. Clients 440 interact with the listing management process 415 and the absentee bidding process 425 to view information about items for sale in the live, in-person auction and submit absentee bids, respectively.

The listing management process 415 interacts with online bidders and provides them with catalog information about the items in which they are interested. The listing management process 415 may support a text-based item listing format, such as that depicted in FIGS. 2A and 2B, and/or a Gallery™ presentation format that includes thumbnail images of the items for sale as described in co-pending U.S. patent application Ser. No. 09/177,726, entitled "Information Presentation and Management in an25 Online Trading Environment" and assigned to the assignee of the present invention. (GALLERY is a trademark of eBay Inc. of San Jose, Calif.).

The absentee bidding process 425 tracks bids submitted by online bidders for the items 210 available in the live, in-person auction. Based upon the bid amounts received, the absentee bidding process 425 selects an absentee bid as the second highest absentee bid received plus a one bid increment amount as listed in a bid increment table provided by the seller.

The live auction interface 435 provides an interface that updates bidding information associated with an item in the online environment to reflect a current bid associated with the item in the live, in-person auction. A real-time bidding process 430 accepts bids from the online bidders, via the live auction interface, reflecting the online bidder's bid price for the item, and bids on behalf of the online bidder against one or more live bidders that are participating in the live, in-person auction. The real-time bidding process 430 in conjunction with the live auction interface 435 enables real-time online bidding in the live, in-person auction While, in order to facilitate explanation, the listing servers 410 are generally discussed as if they were a single device, in actuality, the listing servers 410 may comprise multiple physical and/or logical devices connected in a distributed architecture, and the various functions performed may actually be distributed among multiple devices. For example, any function can be implemented on any number of machines or on a single machine. Also, any process may be divided across multiple machines.

Figure 5:
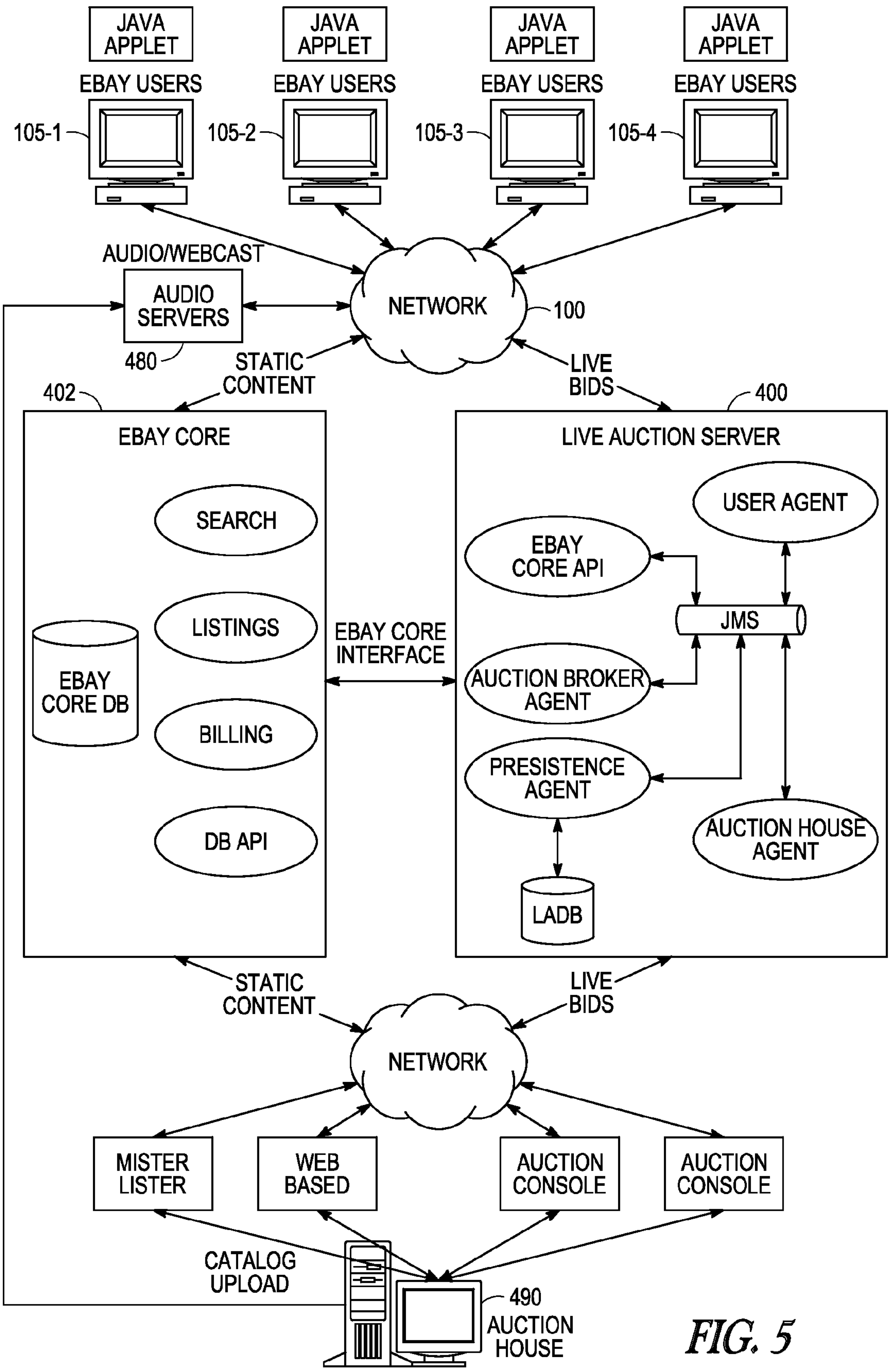
FIG. 5 depicts an exemplary high-level system architecture implementation of the present invention.

FIG. 5 depicts an exemplary high-level system architecture implementation 450 of the Live Auction System 400. The exemplary system architecture 450 incorporates various aspects of FIGS. 1, 3 and 4. Online user 105 (105-1, 105-1, . . . , 105-4) interaction with the live auction system 400 as well as auction house 490 interaction with the live auction system 400 is depicted. An audio server 480 for providing a webcast to online bidders during the live, in-person auction is also depicted. The system architecture 450 is illustrated to provide a high level view of the various components required to implement the live auction system 400. Specific implementation details are provided above with reference to FIGS. 1, 3 and 4, as well as the knowledge available to those skilled in the art to which this invention pertains.

Exemplary Stages of an Integrated Auction

Figure 6:
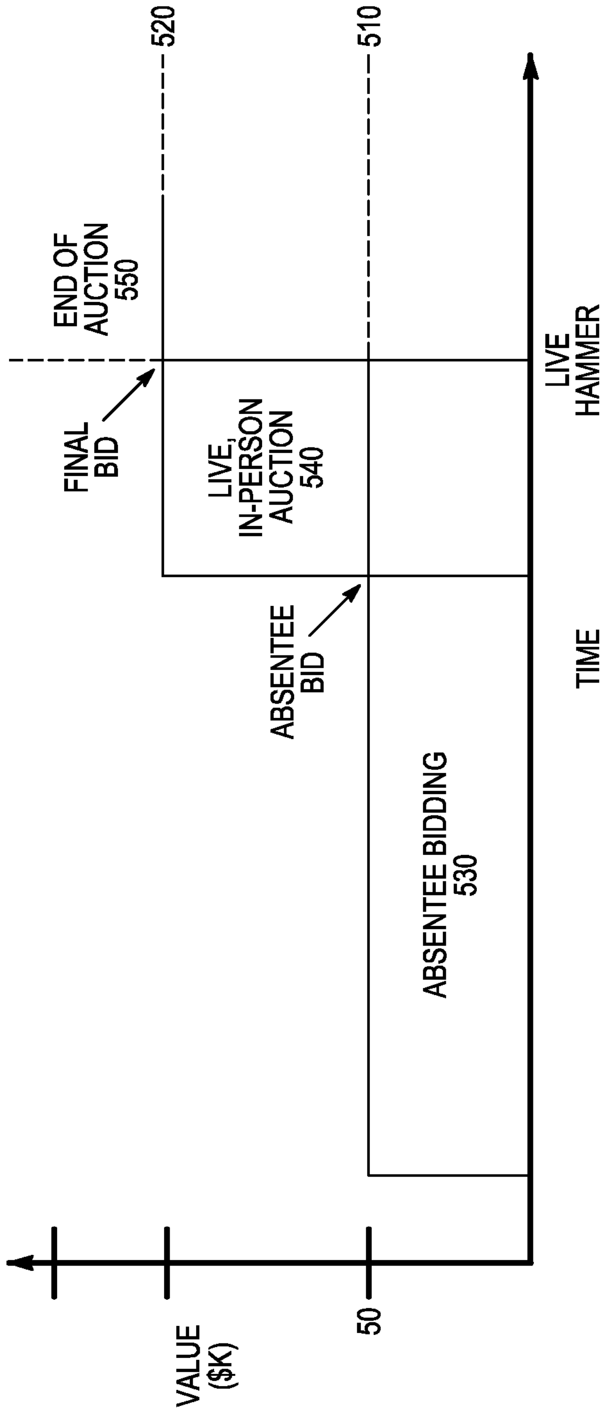
FIG. 6 conceptually illustrates the stages of a live auction according to one embodiment of the present invention.

FIG. 6 conceptually illustrates the stages of a live auction according to one embodiment of the present invention. In this example, a live auction comprises three separate and distinct stages: a pre-auction stage 530, a real-time bidding stage 540, and an end auction stage 550. During the pre-auction stage 530, online users are allowed to search and view items available during the live, in-person auction. In addition, online users that will be unavailable to submit real time bids during the live, in-person auction may submit absentee bids. An absentee bid 510 will be chosen from the absentee bids received during the pre-auction stage 530 and submitted during the live, in-person auction as described below.

Although absentee bids are not required by the present invention, FIG. 6 depicts a final absentee bid 510 chosen in the amount of $50,000. The choice of a final absentee bid 510 signals the beginning of the real-time bidding stage 540. During the real-time bidding stage 540, online bidders bid against other online bidders as well as one or more live bidders that are present at the live, in-person auction. Referring again to FIG. 5, a final bid amount 520 is accepted that exceeds the absentee bid 510 received during the pre-auction stage 530 and signals the beginning of the end-of-auction stage 550. During the end-of-auction stage 550, an online user that enters the final bid is notified via e-mail.

Live Auction Flow

Figure 7A:
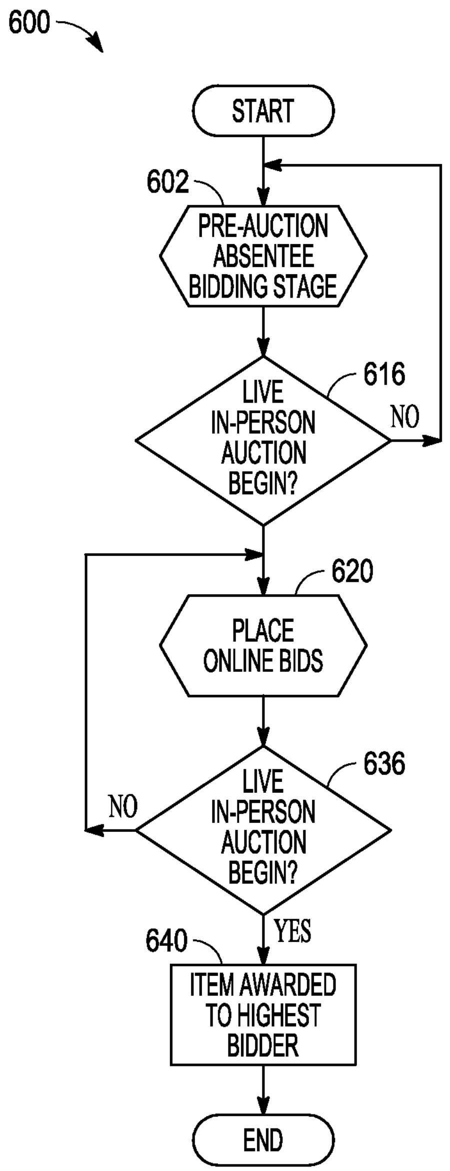
FIGS. 7A-7C are flow diagrams illustrating live auction processing according exemplary embodiments of the present invention.

Procedural method steps for implementing the live auction as described by the present invention are now provided. Referring now to the flow diagram of FIG. 7A, exemplary live auction processing 600 will now be described. At step 602, the live auction begins with the pre-auction absentee bidding stage 530 in which absentee bids are submitted by online users. The pre-auction bidding stage 602 continues until the start of the live, in-person auction at step 616. During the live, in-person auction, the live auction system 400 bids on behalf of any online bidders against one or more live bidders that are participating in the live, in-person auction at step 620, thereby enabling real-time online bidding in the live, in-person auction. Online bids are placed by the live auction system 400 until the live, in-person auction terminates at step 636. Finally, at step 640, the item for bid is awarded to the highest bidder.

Figure 7B:
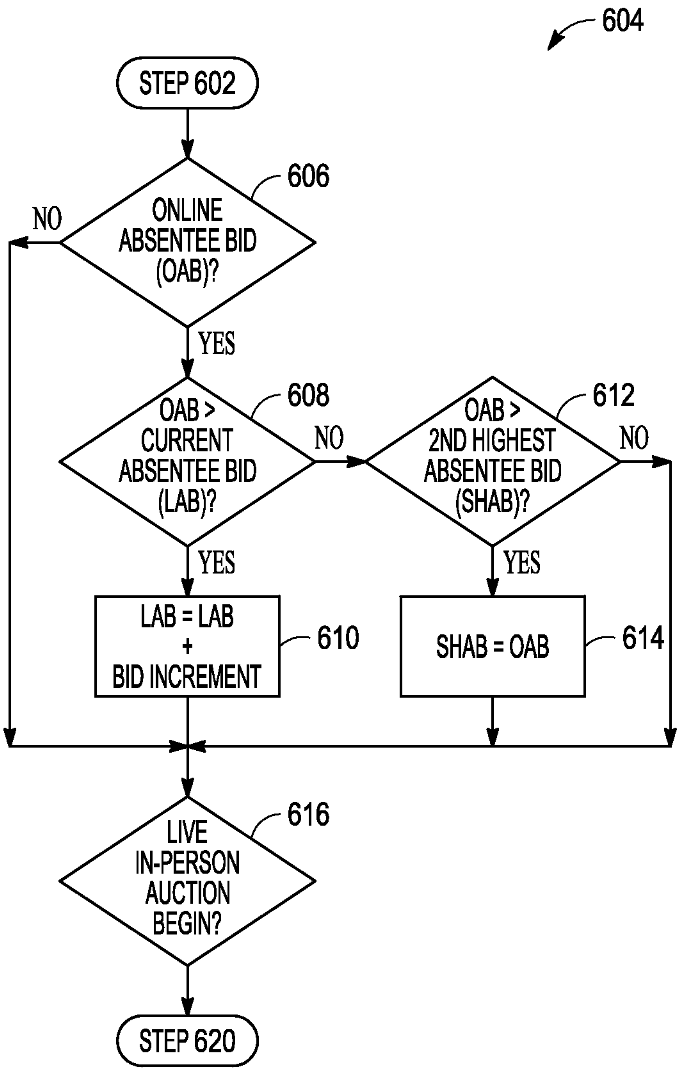
Figure 7C:
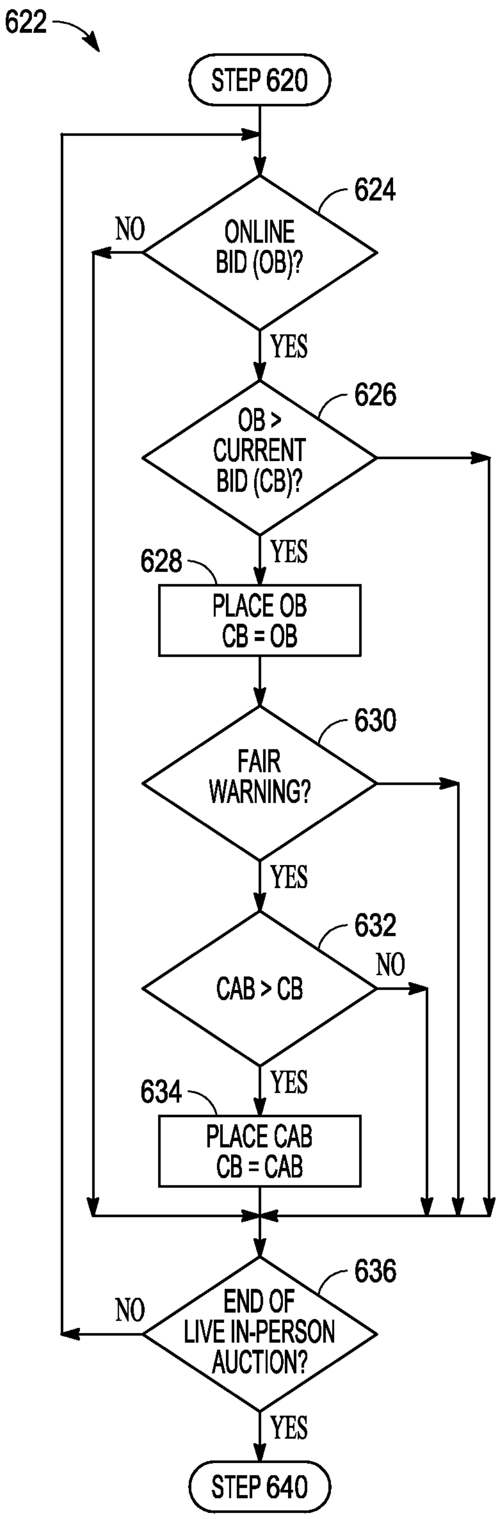

FIG. 7B depicts additional method steps 604 for implementing the pre-auction absentee bidding stage 530 of step 602. At step 606, the pre-auction online bidding stage 530, begins with the receipt of any online absentee bids. As described above, the receipt of absentee bids is optional and is not required for the implementation of the live auction. At step 608, an absentee bid is received and compared with any current absentee bids received by the live auction system. At 610, when the online absentee bid is greater than the current absentee bids received by the system 400, the current absentee bid is updated to equal the current absentee bid plus a bid increment provided by the seller in a bid increment table. Otherwise, at step 612, if the online absentee bid received at step 606 is greater than a second highest absentee bid received by the system 400, step 614 is initiated. At step 614, the second highest absentee bid is set to the online absentee bid received at step 606. Otherwise the online absentee bid received at step 606 is discarded. As described above, the pre-auction absentee bidding stage 602 continues until the start of a live, in-person auction at step 616.

FIG. 8C depicts additional method steps 622 for implementing the real-time online bidding stage 540 of step 620. At step 624, online bids are received. Once an online bid is received, at step 620 the online bid is compared with the c m n t bid of the live, in-person auction. At step 628, if the online bid is greater than the current bid, the online bid is placed in the live, in-person auction. Otherwise the online bid is discarded. At step 630, when fair warning is indicated, step 632 is initialized. At step 632, the highest accepted current absentee bid is compared with the current bid in the live in-person auction. At step 634, if the current absentee bid is greater than the current bid in the live in-person auction, the current absentee bid is converted to the current bid in the live, in-person auction. Otherwise at 632 the absentee bid is discarded. As described above, the real-time online bidding stage 540 continues until the end of the live, in-person auction at step 636. As described with reference to FIG. 6A, the end of the live, in-person auction results in the occurrence of the end-of-auction stage 550 in which the item is awarded to the highest bidder. Assuming the highest bidder is an online bidder, the live auction system notifies the online bidder via email.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing an auction of an item, the method comprising:
- during a first stage of an auction, using one or more computer processors:
  - accepting live bids for the item from on-site bidders at a live, in-person auction;
  - communicating the live bids to on-line bidders;
  - accepting a maximum proxy price from a given on-line bidder, the maximum proxy price indicating a maximum price that the given on-line bidder is willing to pay for the item; and
  - updating bidding information associated with the item to reflect a current bid associated with the item; the current bid based on one of the maximum proxy price and the live bids;
  - during a second stage of an auction, based on one or more on-line bidders having submitted a maximum proxy price greater than a highest bid from the first stage, continuing to accept live bids from the on-site bidders until at least one of the following occurs;
  - all of the maximum proxy prices are exceeded; and
  - no further live bids are received.

2. The method of claim 1, further including automatically bidding on behalf of the given on-line bidder by increasing bidding information associated with the item by a current bid increment supplied by the seller of the item until the maximum proxy price is reached, or a live bid exceeds the maximum proxy price.

3. The method of claim 1, additionally comprising a third stage, the third stage preceding the first stage and comprising:
- establishing a starting bid for the item by performing a pre-bidding process in an on-line environment for a predetermined amount of time; and
- using the starting bid for the item to initiate the first stage of the auction.

4. The method of claim 3, wherein the establishing of the starting bid for the item by performing the pre-bidding process in the on-line environment includes:
- receiving an on-line absentee bid;
- comparing the received on-line absentee bid with a current on-line absentee bid;

based on the received on-line absentee bid being greater than the current on-line absentee bid, updating the current on-line absentee bid to equal the received on-line absentee bid.

5. The method of claim 4, wherein the establishing of the starting bid for the item by performing the pre-bidding process in the on-line environment further includes:
- based on the received on-line absentee bid being less than or equal to a current on-line absentee bid, but greater than a second highest received on-line absentee bid, updating the second highest on-line absentee bid to equal the received on-line absentee hid.

6. The method of claim 4, further including:
- based on the received on-line absentee bid being less than or equal to a current on-line absentee bid, but less than a second highest received on-line absentee bid, discarding the received on-line absentee bid.

7. A computer-implemented method comprising:
- transmitting, using one or more communication devices, to one or more remote auction bidders information about an item being auctioned in a live auction at a live auction site;
- receiving one or more remote auction bids from the one or more remote auction bidders for the item being auctioned;
- choosing, by at least one computer processor that is coupled to a storage device, as a starting bid in the live auction the highest bid from the one or more remote auction bids;
- transmitting the starting bid to an auctioneer of the live auction site who receives live bids and remote auction bids;
- receiving from the auctioneer of the live auction site, an accepted auction bid, wherein the accepted auction bid is selected from a plurality of onsite auction bids and the starting bid; and
- transmitting the accepted auction bid to at least one remote auction bidder.

8. The method of claim 7 further including:
- receiving a maximum remote auction price from at least one remote auction bidder, the maximum remote auction price indicating a maximum price that the at least one remote auction bidder is willing to pay for the item, the maximum remote auction price being higher than the accepted auction bid; and
- bidding on behalf of the at least one remote auction bidder by increasing bidding information associated with the item by a current bid increment supplied by the seller of the item until the maximum remote auction price is reached, or a live bid exceeds the maximum remote auction price.

9. A non-transitory computer-readable storage medium having embedded therein a set of instructions which, when executed by one or more processors of a computer, causes the computer to execute the following operations:

transmitting to one or more remote auction bidders information about an item being auctioned in a live auction at a live auction site;

receiving one or more remote auction bids from the one or more remote auction bidders for the item being auctioned;

choosing as a starting bid in the live auction the highest hid from the one or more remote auction bids;

transmitting the starting bid to an auctioneer of the live auction site who receives live bids and remote auction bids;

receiving, from the auctioneer of the live auction site, an accepted auction bid, wherein the accepted auction bid is selected from a plurality of onsite auction bids and the starting bid; and transmitting the accepted auction bid to at least one remote auction bidder.

* * * * *

UNITED STATES PATENT AND TRADEMARK OFFICE

CERTIFICATE OF CORRECTION

PATENT NO. : 8,527,392 B2
APPLICATION NO. : 12/839259
DATED : September 3, 2013
INVENTOR(S) : Levy et al.

It is certified that error appears in the above-identified patent and that said Letters Patent is hereby corrected as shown below:

In the claims

In column 7, line 48, in Claim 1, after "item;", delete "and", therefor

In column 7, line 52, in Claim 1, after "bids;", insert --and--, therefor

In column 7, line 58, in Claim 1, delete "exceeded; and¶" and insert --exceeded or--, therefor In column 8, line 23, in Claim 5, delete "hid." and insert --bid.--, therefor In column 9, line 7, in Claim 9, delete "hid" and insert --bid--, therefor Signed and Sealed this
Seventeenth Day of November, 2015

Michelle K. Lee

Michelle K. Lee
*Director of the United States Patent and Trademark Office*